(12) United States Patent
Weber

(10) Patent No.: US 11,371,411 B2
(45) Date of Patent: Jun. 28, 2022

(54) METHOD FOR OPERATING A MOTOR VEHICLE HAVING AN EXHAUST GAS AFTERTREATMENT DEVICE, EXHAUST GAS AFTERTREATMENT SYSTEM, COMPUTER PROGRAM PRODUCT AND COMPUTER-READABLE MEDIUM

(71) Applicant: DAIMLER AG, Stuttgart (DE)

(72) Inventor: Hanno Weber, Kirchheim/Teck (DE)

(73) Assignee: MERCEDES-BENZ GROUP AG, Stuttgart (DE)

( * ) Notice: Subject to any disclaimer, the term of this patent is extended or adjusted under 35 U.S.C. 154(b) by 0 days.

(21) Appl. No.: 17/426,315

(22) PCT Filed: Feb. 4, 2020

(86) PCT No.: PCT/EP2020/052762
§ 371 (c)(1),
(2) Date: Jul. 28, 2021

(87) PCT Pub. No.: WO2020/164975
PCT Pub. Date: Aug. 20, 2020

(65) Prior Publication Data
US 2022/0099011 A1 Mar. 31, 2022

(30) Foreign Application Priority Data
Feb. 14, 2019 (DE) .................... 10 2019 001 091.4

(51) Int. Cl.
*F01N 11/00* (2006.01)
*F01N 3/20* (2006.01)
(52) U.S. Cl.
CPC .......... *F01N 3/208* (2013.01); *F01N 3/2073* (2013.01); *F01N 2610/02* (2013.01); *F01N 2900/0402* (2013.01); *F01N 2900/1814* (2013.01)

(58) Field of Classification Search
CPC ................... F01N 2610/142; F01N 2900/1814
See application file for complete search history.

(56) References Cited

U.S. PATENT DOCUMENTS

| 9,322,316 B2 | 4/2016 | Jung |
| 9,626,812 B2 | 4/2017 | See et al. |
| 2010/0086446 A1 | 4/2010 | Matsunaga et al. |
| 2010/0145638 A1* | 6/2010 | Begin ................... G01F 23/804 702/55 |

(Continued)

FOREIGN PATENT DOCUMENTS

| DE | 102013104752 A1 | 7/2014 |
| DE | 112013002497 T5 | 1/2015 |

(Continued)

OTHER PUBLICATIONS

Gegusch et al.; "Methode Zur Überwachung Des Harnstoffverbrauchs;" ATZ—Automobiltechnische Zeitschrift; May 2014; pp. 36-43; https://doi.org/10.1007/s35148-014-0403-5.

(Continued)

*Primary Examiner* — Jonathan R Matthias
(74) *Attorney, Agent, or Firm* — Patent Portfolio Builders PLLC

(57) ABSTRACT

A method for operating a motor vehicle having an exhaust gas aftertreatment device involves an on-board electronic computing device receiving consumption information characterizing consumption of a reducing agent by the exhaust gas aftertreatment device and tank information characterizing a filling level of a reducing agent tank. Tank information is evaluated together with the consumption information with regard to a divergence, and upon determination of the divergence between the tank information and the consumption information, error information is stored in a blockchain characterizing the motor vehicle, and an action of the motor vehicle is triggered.

5 Claims, 1 Drawing Sheet

(56) References Cited

U.S. PATENT DOCUMENTS

| | | | |
|---|---|---|---|
| 2015/0088362 A1* | 3/2015 | See | F01N 3/208 701/33.9 |
| 2016/0017781 A1* | 1/2016 | Nihongi | G01N 33/18 73/61.43 |
| 2016/0040580 A1* | 2/2016 | Khaled | F02B 77/083 60/277 |
| 2018/0018723 A1 | 1/2018 | Nagla et al. | |
| 2018/0374283 A1 | 12/2018 | Pickover et al. | |
| 2020/0040787 A1 | 2/2020 | Brandt | |

FOREIGN PATENT DOCUMENTS

| | | |
|---|---|---|
| DE | 102014017829 A1 | 6/2016 |
| DE | 102016219834 B4 | 1/2019 |
| DE | 102018213076 A1 | 2/2020 |
| EP | 2982839 A1 | 2/2016 |
| WO | 2018014123 A1 | 1/2018 |

OTHER PUBLICATIONS

International Search Report dated Mar. 24, 2020 in related/corresponding International Application No. PCT/EP2020/052762.
Office Action created Dec. 10, 2019 in related/corresponding DE Application No. 10 2019 001 091.4.
Rentrop et al.; "Definition 'Blockchain-basierte Vertäge' Was ist ein Smart Contract?;" Mar. 2, 2017; https://www.dev-insider.de/was-ist-ein-smart-contract-a-585679/.
Written Opinion dated Mar. 24, 2020 in related/corresponding International Application No. PCT/EP2020/052762.

* cited by examiner

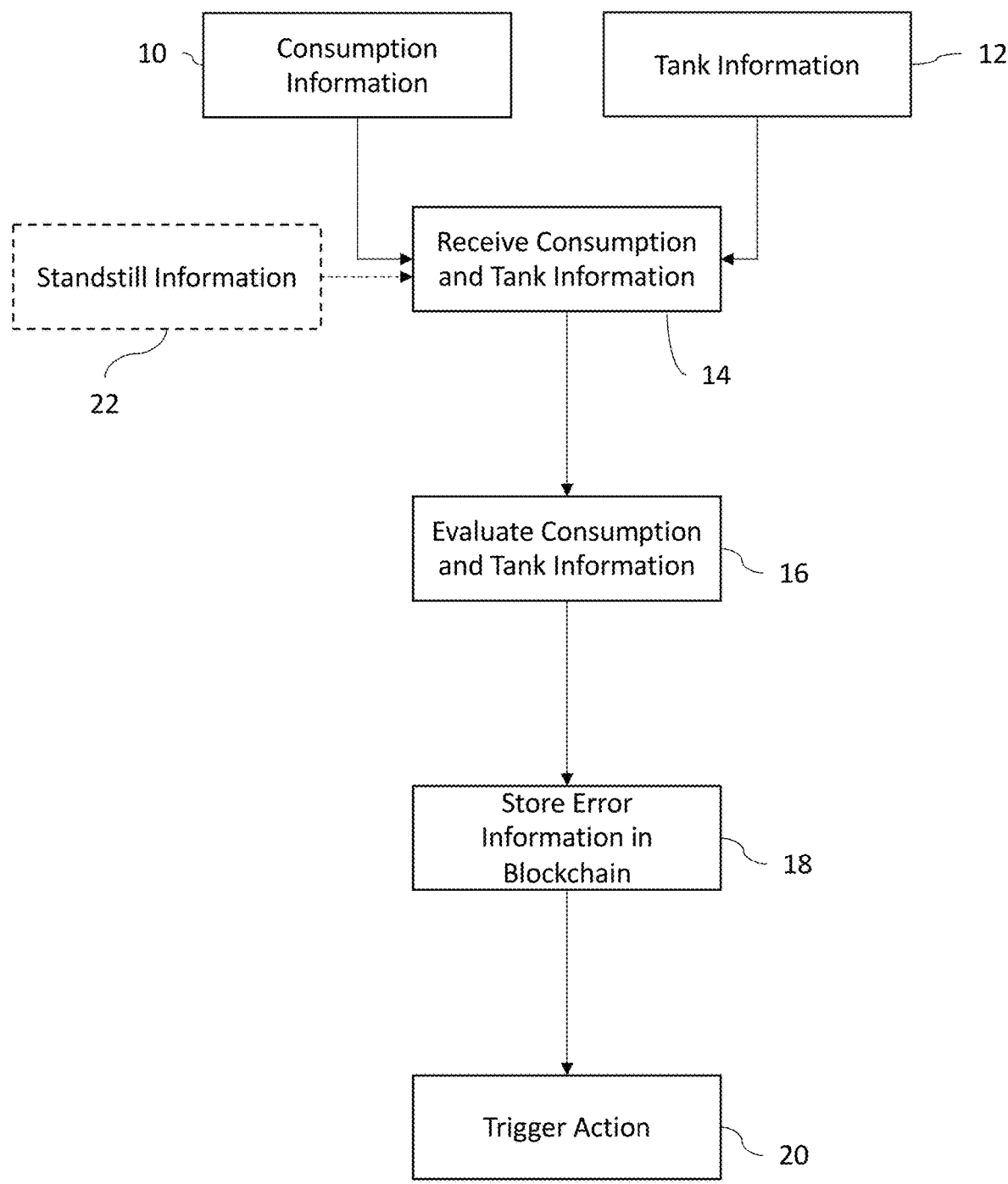

METHOD FOR OPERATING A MOTOR VEHICLE HAVING AN EXHAUST GAS AFTERTREATMENT DEVICE, EXHAUST GAS AFTERTREATMENT SYSTEM, COMPUTER PROGRAM PRODUCT AND COMPUTER-READABLE MEDIUM

BACKGROUND AND SUMMARY OF THE INVENTION

Exemplary embodiments of the invention relate to a method for operating a motor vehicle having an exhaust gas aftertreatment device, an exhaust gas aftertreatment system, a computer program product, and a computer-readable medium.

WO 2018/014123 A1 discloses a system for vehicle records, which comprises a vehicle history application. The vehicle history application is adapted to receive a notification characterizing a vehicle event, wherein it may be a service event. Attributes of the event may be stored in a blockchain.

Exemplary embodiments of the present invention are directed to a method for operating a motor vehicle having an exhaust gas aftertreatment device, an exhaust gas aftertreatment system for a motor vehicle, a computer program product, and a computer-readable medium, by means of which a manipulation of an exhaust gas aftertreatment device can be averted.

To prevent manipulation of exhaust gas aftertreatment devices, a method for operating a motor vehicle having an exhaust gas aftertreatment device is provided in accordance with the invention, in which consumption information is received by means of an on-board electronic computing device which characterizes consumption of the exhaust gas aftertreatment device by a reducing agent. In particular, the exhaust gas aftertreatment device can be an exhaust gas aftertreatment device based on a selective catalytic reaction, in which nitrogen oxides in an exhaust gas of the motor vehicle are to be reduced with the addition of the reducing agent. The reducing agent can be used, in particular, in fluid form in the exhaust gas aftertreatment device to reduce nitrogen oxides in the exhaust gas. By way of example, the reducing agent is urea or ammonia reacting with the exhaust gas in liquid or gaseous form. The consumption information can, for example, be determined by means of a computing device for a determined composition of the exhaust gas and a predetermined setting of nitrogen oxide concentration to be set of nitrogen oxides in the exhaust gas and be provided for the on-board electronic computing device. Thus, the consumption information characterizes how much of the reducing agent is required to set a predetermined value for nitrogen oxides in the exhaust gas after exhaust gas aftertreatment given the determined composition of the exhaust gas, or to reduce a determined nitrogen oxide content in the exhaust gas by a predetermined proportion as part of the exhaust gas aftertreatment. In the method, it is further provided that tank information characterizing a filling level of a reducing agent tank is received by means of the electronic computing device. The reducing agent used for the exhaust gas aftertreatment is stored in the reducing agent tank and is provided by the reducing agent tank to the exhaust gas aftertreatment device. The tank information characterizing the filling level of the reducing agent tank can be determined, for example, by means of a sensor arranged in the reducing agent tank or on the reducing agent tank, in particular a float, and made available to the on-board electronic computing device. By means of the on-board electronic computing device, the divergence of the tank information and the consumption information is also evaluated in accordance with the invention. This means that it is determined whether the received tank information is realistic or appropriate with regard to the consumption information. If it is determined that the tank information is realistic or appropriate with regard to the consumption information, the divergence is not determined. If a state of the exhaust gas aftertreatment device determined depending on the tank information deviates by more than a defined predetermined amount from a state of the exhaust gas aftertreatment device determined depending on the consumption information, the divergence between the tank information and the consumption information is determined. It is further provided in the method according to the invention that, when the divergence between the tank information and the consumption information is determined, error information is stored in a blockchain characterizing the motor vehicle and an action of the motor vehicle is triggered. Thus, as soon as the divergence is determined, the error information characterizing the divergence is stored in the blockchain, such that subsequent deletion or modification of the error information is possible only with particularly high effort. Thus, if the divergence is determined in the course of the method, the divergence is stored in the blockchain in the form of the error information, such that the error information characterizing the divergence is permanently available and indicates a possible manipulation, such that the motor vehicle characterized by the error information can be checked with regard to a manipulation. In the method, it is further provided that the electronic computing device on the vehicle triggers the action, such that the motor vehicle reacts to the possible manipulation. The method thus makes it particularly easy to check continuity between the tank information characterizing the filling level and the consumption information characterizing the consumption of the exhaust gas aftertreatment device, wherein the storage of the error information in the blockchain makes it more difficult to manipulate the error information in the event of the determined divergence.

In a development of the invention, it has been shown to be advantageous if standstill information characterizing a standstill of the motor vehicle is received by means of the electronic computing device and storage of the error information in the blockchain is omitted if the divergence occurs when the motor vehicle is at a standstill. That means that, by means of the on-board electronic computing device, it is determined whether the motor vehicle is at a standstill, wherein storing of the error information in the blockchain is omitted, provided that the divergence occurs with tank information determined during a standstill. In particular, during a standstill of the motor vehicle, the reducing agent tank can be refilled with the reducing agent. A divergence during standstill can thus occur in that the consumption information characterizes a consumption of the reducing agent, whereas the tank information characterizes an increase in the filling level of the reducing agent tank. In order to avoid the error information being stored in the blockchain due to the filling of the reducing agent tank with the reducing agent, the error information is not stored in the blockchain, provided that the tank information has been determined during the standstill of the motor vehicle. Alternatively, or additionally, the determination of the divergence during a standstill of the motor vehicle or of tank information determined during the standstill of the motor vehicle can already be prevented by means of the electronic computing device. The inclusion of the standstill information in the decision as to whether or not the error information is stored in the blockchain leads to a particularly low error rate when determining and storing the error information in the blockchain.

In a further design of the invention, it has been shown to be advantageous if the electronic computing device is used to trigger, as an action, an output of a warning signal in an interior of the motor vehicle and/or a disabling of an engine of the motor vehicle when the motor vehicle is restarted and/or a transmission of the error information to a computing device external to the vehicle. The warning signal can be emitted acoustically and/or visually and/or haptically in the interior of the motor vehicle. By way of example, the warning signal can be output in the form of an acoustic and/or visual warning message which characterizes that a next service point is to be approached in order to avoid a registration expiring. Alternatively, or additionally, the warning message can characterize that, due to the divergence, deviating tolls are to be paid and/or penalty payments against the forwarding agent and/or the driver can occur or will occur. Furthermore, the warning message can alternatively or additionally characterize the information that the engine will not start when the motor vehicle is switched off due to the determined divergence. As an action, the engine of the motor vehicle, for example an internal combustion engine or an electric motor, can alternatively or additionally be disabled such that a restart of the engine after a manual switch-off of the engine is omitted. Alternatively, or additionally, the error information can be sent out to the electronic computing device external to the vehicle as an action, wherein the electronic computing device external to the vehicle can be a server device of a forwarding agent owning the motor vehicle and/or the police. In this way, the police and/or the forwarding agent can be informed particularly easily about the determined divergence, such that the police and/or the forwarding agent can check the exhaust gas aftertreatment device of the motor vehicle for manipulations.

In a further design of the invention, it has been shown to be advantageous if a predetermined time interval is started by means of the electronic computing device when storing the error information of a blockchain, and that the action is triggered after expiry of the time interval if a problem resolution action is omitted, and the action is omitted if the problem resolution action is performed within the time interval. In other words, the time interval is a grace period within which the triggering of the action can be prevented by performing the problem resolution action. Regardless of the problem resolution action, the error information is stored in the blockchain promptly after the divergence is determined. By way of example, it is possible that, when the time interval is started, a warning message characterizing the start of the time interval is emitted in the interior of the motor vehicle as the first action. If the problem resolution action is not carried out within the specified time interval, then a second action is triggered, for example, disabling the engine for restarting and/or providing the error information to the electronic computing device that is external to the vehicle. If the problem resolution action is performed within the specified time interval, then the second action is not performed. Via the problem resolution action, a driver of the motor vehicle thus has the option of preventing the triggering of the action, for example the second action. In this context, it has been shown to be particularly advantageous if the action is prevented from being triggered by means of the electronic computing device if, before the time interval has elapsed, repair information which can be assigned to the error information and which characterizes a repair of the exhaust gas aftertreatment device as a problem resolution action is received by means of the electronic computing device. This means that, by means of the electronic computing device, the triggering of the action or the triggering of the second action is basically prevented if it is determined that the exhaust gas aftertreatment device has been repaired as part of the problem resolution action. In particular, this repair information is associated with the error information and stored in the blockchain, such that it can be seen in the blockchain that the error information has been determined and the problem resolution action has been performed. In this way, for example, the expiry of a registration for the motor vehicle can be prevented as a second action.

The invention further relates to an exhaust gas aftertreatment system for a motor vehicle, having an exhaust gas aftertreatment device and an on-board electronic computing device, as have each already been described in connection with the method according to the invention. The electronic computing device is arranged to carry out the above-described method according to the invention. The exhaust gas aftertreatment system is thus particularly secure against manipulation of the exhaust gas aftertreatment device.

The invention further relates to a computer program product comprising instructions which, in turn, cause the electronic computing device of the exhaust gas aftertreatment system to perform the method according to the invention.

Moreover, the invention comprises a computer-readable medium on which the computer program product according to the invention is stored. Advantages and advantageous developments of the method according to the invention are to be regarded as advantages and advantageous developments of the exhaust gas aftertreatment system according to the invention, the computer program product according to the invention and the computer-readable medium according to the invention, and vice versa.

Further advantages, features and details of the invention emerge from the following description of preferred exemplary embodiments and from the drawing. The features and combinations of features mentioned above in the description, as well as the features and combinations of features mentioned below in the description of FIGURES and/or shown in the single FIGURE alone, can be used not only in the combination specified in each case, but also in other combinations or on their own, without departing from the scope of the invention.

BRIEF DESCRIPTION OF THE DRAWING FIGURE

The sole FIGURE illustrates a method diagram for a method of operating a motor vehicle which has an exhaust gas aftertreatment device and an electronic computing device.

DETAILED DESCRIPTION

The single FIGURE shows a method diagram for a method of operating a motor vehicle which has an exhaust gas aftertreatment device and an electronic computing device, wherein by means of the electronic computing device, a divergence between a determined consumption of a reducing agent in the exhaust gas aftertreatment device and a filling level of a reducing agent tank in which the reducing agent is stored is determined, and, as a result of the determined divergence, error information characterizing the divergence is stored in a blockchain characterizing the motor vehicle, and an action is carried out by means of the electronic computing device. The motor vehicle is in particular an automobile, in particular a lorry. In order to prevent forwarding agents from manipulating an exhaust gas aftertreatment device of a motor vehicle for cost reasons in order to thereby achieve particularly low transport costs per kilometer, a method for operating a motor vehicle having an exhaust gas aftertreatment device described below is provided. By means of the method, manipulation of the exhaust gas aftertreatment device should be made more difficult. In the present case, the exhaust gas aftertreatment device is used to carry out an exhaust gas aftertreatment of exhaust gas from the motor vehicle based on selective catalytic reaction. For this purpose, exhaust gas of the motor vehicle is reacted with a reducing agent in order to reduce nitrogen oxides in the exhaust gas as part of the exhaust gas aftertreatment. In order to prevent manipulation of the exhaust gas aftertreatment device, it is provided in the method that a possible manipulation is determined and error information characterizing the possible manipulation is stored in association with the motor vehicle, wherein the error information is stored in the method in such a way that it can be changed or deleted only with a particularly high level of effort.

A method diagram for the method is depicted in the sole FIGURE. First, consumption information 10 and tank information 12 are provided to an on-board electronic computing device of the motor vehicle. The consumption information 10 characterizes a consumption of the exhaust gas aftertreatment device of a reducing agent, in this case a urea solution for the aftertreatment of the exhaust gas of the motor vehicle. The consumption information can characterize a volume flow and/or a mass flow and/or an absolute volume and/or an absolute mass of consumed reducing agent. The tank information 12 characterizes a filling level of a reducing agent tank of the motor vehicle, in which the reducing agent is to be stored and from which the reducing agent is supplied to the exhaust gas aftertreatment device.

The electronic computing device receives at least the consumption information 10 and the tank information 12 a first method step 14. Following receipt of the consumption information 10 and the tank information 12, the electronic computing device evaluates the consumption information 10 and the tank information 12 in a second method step 16 with regard to a divergence and thus an inconsistency between the consumption information 10 and the tank information 12.

If the divergence is determined in a second method step 16, then error information characterizing the divergence is stored by means of the electronic computing device in a third method step 18 in a blockchain associated with the motor vehicle. Simultaneously with the third method step 18, a fourth method step 20 can be triggered by means of the electronic computing device as a result of the determination of the divergence, wherein, in the fourth method step 20, the electronic computing device triggers an action. The action can be the output of a warning signal, in particular an acoustic and/or visual warning message in the interior of the motor vehicle and/or a disabling of an engine of the motor vehicle when the motor vehicle is restarted and/or a provision of the error information for an electronic computing device external to the vehicle.

As an alternative to the simultaneous execution of the third method step 18 and the fourth method step 20, a predetermined time interval can be started during the execution of the third method step 18, within which an execution of the action can be stopped, provided that a problem resolution action takes place within the time interval. If the problem resolution action does not take place by the time interval expires, the action in the method step 20 is triggered after the time interval expires. As a problem resolution action, a driver or owner of the motor vehicle can carry out a repair of the exhaust gas aftertreatment device, as a result of which repair information characterizing the repair of the exhaust gas aftertreatment device is provided to the on-board electronic computing device. As a result of receiving the repair information, the electronic computing device stops the action if the repair information has been received within the predetermined time interval and stores the repair information associated with the error information in the blockchain.

In order to avoid the error information being stored in the blockchain because a divergence between the consumption information and the tank information occurs when the reducing agent tank is filled up, it is provided in the present case that the electronic computing device receives standstill information 22 in the first method step 14, provided that the motor vehicle is in a standstill. The standstill information 22 characterizes a time and/or a duration of the standstill of the motor vehicle. In the present case, the electronic computing device prevents the second to fourth method steps 16, 18, 20 for tank information 12 received during the standstill.

The described exhaust gas aftertreatment device can, in particular, be part of an exhaust gas aftertreatment system of the motor vehicle which, in addition to the exhaust gas aftertreatment device, comprises the described on-board electronic computing device. In particular, a computer program product can be provided that comprises instructions causing the electronic computing device to perform the described method steps of the method. For this purpose, a computer-readable medium can be provided, on which the computer program product is stored.

The described method is based on the knowledge that a functioning exhaust gas aftertreatment system, in particular an SCR system, can be simulated by means of auxiliary control units and/or emulators, even though the SCR system is deactivated, in order to keep mileage-related transport costs for forwarding agents particularly low. Exhaust gas values of motor vehicles equipped with correspondingly manipulated SCR systems are extremely poor, since combustion in internal combustion engines of these motor vehicles is designed for exhaust gas aftertreatment by means of selective catalytic reaction (SCR). Moreover, in case of manipulation of the exhaust gas aftertreatment system (SCR system), competition between forwarding agents is distorted, since tolls of motor vehicles with manipulated exhaust gas aftertreatment systems do not correspond to an actual pollutant class of the associated motor vehicles. In order to prevent manipulation of the exhaust gas aftertreatment system, in particular the exhaust gas aftertreatment device, blockchain technology is used, in particular in connection with smart contracts, which are executed by the electronic computing device. These smart contracts automatically check a fulfilment of criteria, in this case the presence of divergence, and independently execute assigned actions. In the present method, an expected consumption of the reducing agent is compared with an actual decrease in a liquid level of the reducing agent in the reducing agent tank. When the divergence between the expected consumption and the actual drop of the liquid level is determined, the error information is stored indelibly in the blockchain and reported to the electronic computing device external to the vehicle.

If the motor vehicle is in motion, the reducing agent tank cannot be refilled. It can therefore be expected that, depending on the amount of reducing agent requested by an engine control unit for injection, the level in the reducing agent tank will drop accordingly. If the level in the reducing agent tank decreases accordingly and thus the actual consumption takes place according to the expected consumption, the smart contract is not fulfilled because there is no divergence. The condition for the fulfilment of the smart contract and thus for the presence of the divergence and consequently for the triggering of the action is that the level in the reducing agent tank does not fall in accordance with the expected consumption.

As an action, an output of the warning message in an instrument cluster of an interior of the motor vehicle, which characterizes, for example, that the engine of the motor vehicle will not start shortly, can be triggered. In addition, a notification to a Cloud as well as a storing of the error information in the blockchain can be performed, such that a service facility and/or the police can monitor a degree of roadworthiness of the motor vehicle. As a result of storing the error information in the blockchain or reporting the error information to the Cloud, it is clear that there is a fault in the exhaust gas aftertreatment system or that a manipulation of the exhaust gas aftertreatment system has been carried out. The error information can only be deleted with particularly great effort because it is stored in the blockchain. As a result of the repair, only the repair information can be stored as a correction.

The reducing agent tank can be refueled while the motor vehicle is stationary, whereby the conditions of the smart contract are updated.

The method makes it possible to ensure exhaust gas purification over the life of the vehicle with particular low additional hardware costs due to the motor vehicle. On the hardware side, a float in particular can be arranged in the reducing agent tank, wherein the tank information can be provided by means of the float. The method makes it possible to at least substantially rule out manipulation of the exhaust gas aftertreatment system to the detriment of competition among forwarding agents and air pollution control.

Although the invention has been illustrated and described in detail by way of preferred embodiments, the invention is not limited by the examples disclosed, and other variations can be derived from these by the person skilled in the art without leaving the scope of the invention. It is therefore clear that there is a plurality of possible variations. It is also clear that embodiments stated by way of example are only really examples that are not to be seen as limiting the scope, application possibilities or configuration of the invention in any way. In fact, the preceding description and the description of the FIGURES enable the person skilled in the art to implement the exemplary embodiments in concrete manner, wherein, with the knowledge of the disclosed inventive concept, the person skilled in the art is able to undertake various changes, for example, with regard to the functioning or arrangement of individual elements stated in an exemplary embodiment without leaving the scope of the invention, which is defined by the claims and their legal equivalents, such as further explanations in the description.

The invention claimed is:

1. A method for operating a motor vehicle having an exhaust gas aftertreatment device, the method comprising:
   receiving, by an on-board electronic computing device of the motor vehicle, consumption information characterizing how much of a reducing agent is required to set a predetermined value for nitrogen oxides in exhaust gas after treatment by the exhaust gas aftertreatment device given a determined composition of exhaust gas or how much of the reducing agent is required to reduce a determined nitrogen oxide content in the exhaust gas by a predetermined proportion by the exhaust gas aftertreatment device;
   receiving, by the on-board electronic computing device of the motor vehicle, tank information characterizing a filling level of a reducing agent tank of the motor vehicle;
   determining, by the on-board electronic computing device of the motor vehicle, that there is a divergence between the received consumption information and the received tank information;
   storing, responsive to the determination that there is a divergence between the received consumption information and the received tank information, error information in a blockchain characterizing the motor vehicle; and
   triggering, responsive to the determination that there is a divergence between the received consumption information and the received tank information, an action of the motor vehicle,
   the method further comprising
   starting, by the electronic computing device, a predetermined time interval when storing the error information in the blockchain, wherein the action is triggered after the time interval has elapsed if a problem resolution action is omitted, and the action is omitted if the problem resolution action is performed within the time interval,
   wherein the action is prevented from being triggered by the electronic computing device if repair information that is assignable to the error information and which characterises a repair of the exhaust gas aftertreatment device as a problem resolution action is received by the electronic computing device before the time interval expires.

2. The method of claim 1, further comprising:
   receiving, by the electronic computing device, standstill information characterising a standstill of the motor vehicle, wherein the of the error information in the blockchain is omitted if the divergence occurs when the motor vehicle is at a standstill.

3. The method of claim 1, wherein the action is an output of a warning signal in an interior of the motor vehicle, a disabling of an engine of the motor vehicle during a restart of the motor vehicle, or a transmission of the error information to a computing device external to the vehicle.

4. An exhaust gas aftertreatment system for a motor vehicle, the exhaust gas aftertreatment system comprising:
   an exhaust gas aftertreatment device; and
   an on-board electronic computing device, which is configured to
      receive consumption information characterizing how much of a reducing agent is required to set a predetermined value for nitrogen oxides in exhaust gas after treatment by the exhaust gas aftertreatment device given a determined composition of exhaust gas or how much of the reducing agent is required to reduce a determined nitrogen oxide content in the exhaust gas by a predetermined proportion by the exhaust gas aftertreatment device;
      receive tank information characterizing a filling level of a reducing agent tank of the motor vehicle;
      determine that there is a divergence between the received consumption information and the received tank information;
      store, responsive to the determination that there is a divergence between the received consumption information and the received tank information, error information in a blockchain characterizing the motor vehicle; and trigger, responsive to the determination that there is a divergence between the received consumption information and the received tank information, an action of the motor vehicle, wherein the on-board electronic computing device is further configured to start a predetermined time interval when storing the error information in the blockchain, wherein the action is triggered after the time interval has elapsed if a problem resolution action is omitted, and the action is omitted if the problem resolution action is performed within the time interval, wherein the action is prevented from being triggered by the electronic computing device if repair information that is assignable to the error information and which characterises a repair of the exhaust gas aftertreatment device as a problem resolution action is received by the electronic computing device before the time interval expires.

5. A non-transitory computer-readable medium, which stores a computer program product for operating a motor vehicle having an exhaust gas aftertreatment device, which when executed by an electronic computing device causes the electronic computing device to:

receive consumption information characterizing how much of a reducing agent is required to set a predetermined value for nitrogen oxides in exhaust gas after treatment by the exhaust gas aftertreatment device given a determined composition of exhaust gas or how much of the reducing agent is required to reduce a determined nitrogen oxide content in the exhaust gas by a predetermined proportion by the exhaust gas aftertreatment device;

receive tank information characterizing a filling level of a reducing agent tank of the motor vehicle;

determine that there is a divergence between the received consumption information and the received tank information;

store, responsive to the determination that there is a divergence between the received consumption information and the received tank information, error information in a blockchain characterizing the motor vehicle; and trigger, responsive to the determination that there is a divergence between the received consumption information and the received tank information, an action of the motor vehicle, wherein the execution of the computer program product by the electronic computing device further causes the electronic computing device to start a predetermined time interval when storing the error information in the blockchain, wherein the action is triggered after the time interval has elapsed if a problem resolution action is omitted, and the action is omitted if the problem resolution action is performed within the time interval, wherein the action is prevented from being triggered by the electronic computing device if repair information that is assignable to the error information and which characterises a repair of the exhaust gas aftertreatment device as a problem resolution action is received by the electronic computing device before the time interval expires.

* * * * *